United States Patent
Chen et al.

(10) Patent No.: US 10,437,370 B2
(45) Date of Patent: Oct. 8, 2019

(54) TOUCH PANEL, ELECTRONIC DEVICE WITH SAME, AND METHOD FOR FABRICATING SAME

(71) Applicants: INTERFACE TECHNOLOGY (CHENGDU) CO., LTD, Chengdu (CN); INTERFACE OPTOELECTRONICS (SHENZHEN) CO., LTD., Shenzhen (CN); GENERAL INTERFACE SOLUTION LIMITED, Zhubei (TW)

(72) Inventors: Hsiao-Chien Chen, Hsinchu (TW); Chun-Lin Tseng, Hsinchu (TW); Chih-Peng Chang, Hsinchu (TW); Chun-Ming Chen, Hsinchu (TW); Ping-Yang Chen, Hsinchu (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhubei (TW)

( * ) Notice: Subject to any disclaimer, the term of this patent is extended or adjusted under 35 U.S.C. 154(b) by 0 days.

(21) Appl. No.: 15/920,583

(22) Filed: Mar. 14, 2018

(65) Prior Publication Data
US 2019/0129545 A1    May 2, 2019

(30) Foreign Application Priority Data
Oct. 26, 2017  (CN) .......................... 2017 1 1013372

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0443* (2019.05); *G06F 2203/04103* (2013.01); *G06F 2203/04111* (2013.01)

(58) Field of Classification Search
CPC ...... G06F 3/041; G06F 3/0412; G06F 3/0416; G06F 3/044; G06F 2203/04103; G06F 2203/04111
See application file for complete search history.

(56) References Cited

U.S. PATENT DOCUMENTS

| | | | | |
|---|---|---|---|---|
| 2012/0026107 A1* | 2/2012 | Kim | .................. | G06F 3/044 345/173 |
| 2013/0106727 A1* | 5/2013 | Juan | .................. | G06F 3/044 345/173 |
| 2015/0009422 A1* | 1/2015 | Tung | .................. | G06F 3/044 349/12 |
| 2016/0328039 A1* | 11/2016 | Lin | .................. | G06F 3/044 |

* cited by examiner

*Primary Examiner* — Nathan Danielsen
(74) *Attorney, Agent, or Firm* — ScienBiziP, P.C.

(57) ABSTRACT

A touch panel embedded in an electronic device defines a display region and a non-display region. The touch panel includes a cover and a touch sensing layer bonded on the cover. The touch sensing layer includes a substrate, a touch sensor disposed on the substrate in the display region, a peripheral circuit structure disposed on the substrate in the non-display region, and a decoration layer. The peripheral circuit structure is electrically connected with the touch sensor for receiving signals from the touch sensor. The decoration layer is disposed in the touch sensing layer.

18 Claims, 10 Drawing Sheets

TOUCH PANEL, ELECTRONIC DEVICE WITH SAME, AND METHOD FOR FABRICATING SAME

FIELD

The present disclosure relates to a touch panel, an electronic device with the touch panel, and a method for fabricating the touch panel.

BACKGROUND

Display devices, such as liquid crystal display devices and organic electroluminescent (EL) display devices are widespread. The display device with a touch panel defines a display region and a non-display region surrounding the display region. The non-display region may be an opaque area. The touch panel includes a cover, a touch substrate attached to the cover, and a decoration layer located between the cover and the touch substrate corresponding to the non-display region. The decoration layer increases a thickness of the touch panel. Improvement in the art is preferred.

BRIEF DESCRIPTION OF THE FIGURES

Implementations of the present disclosure will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

The present disclosure is described in relation to an electronic device utilizing a photoresist layer or part in a process of fabricating a peripheral circuit structure and a touch sensing layer also serving as a decoration layer. The thickness of the touch panel of the electronic device is thereby reduced.

Figure 1:
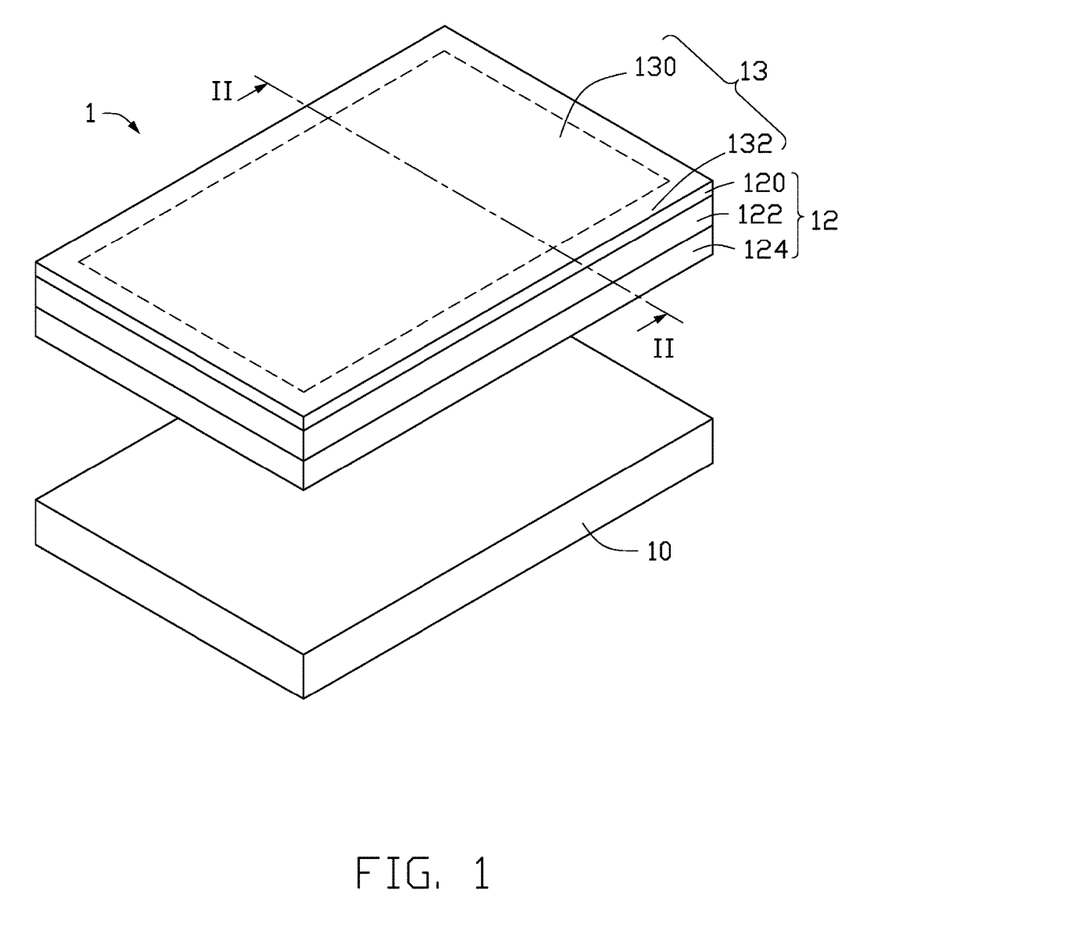
FIG. 1 is an isometric view of an embodiment of an electronic device.
Figure 2:
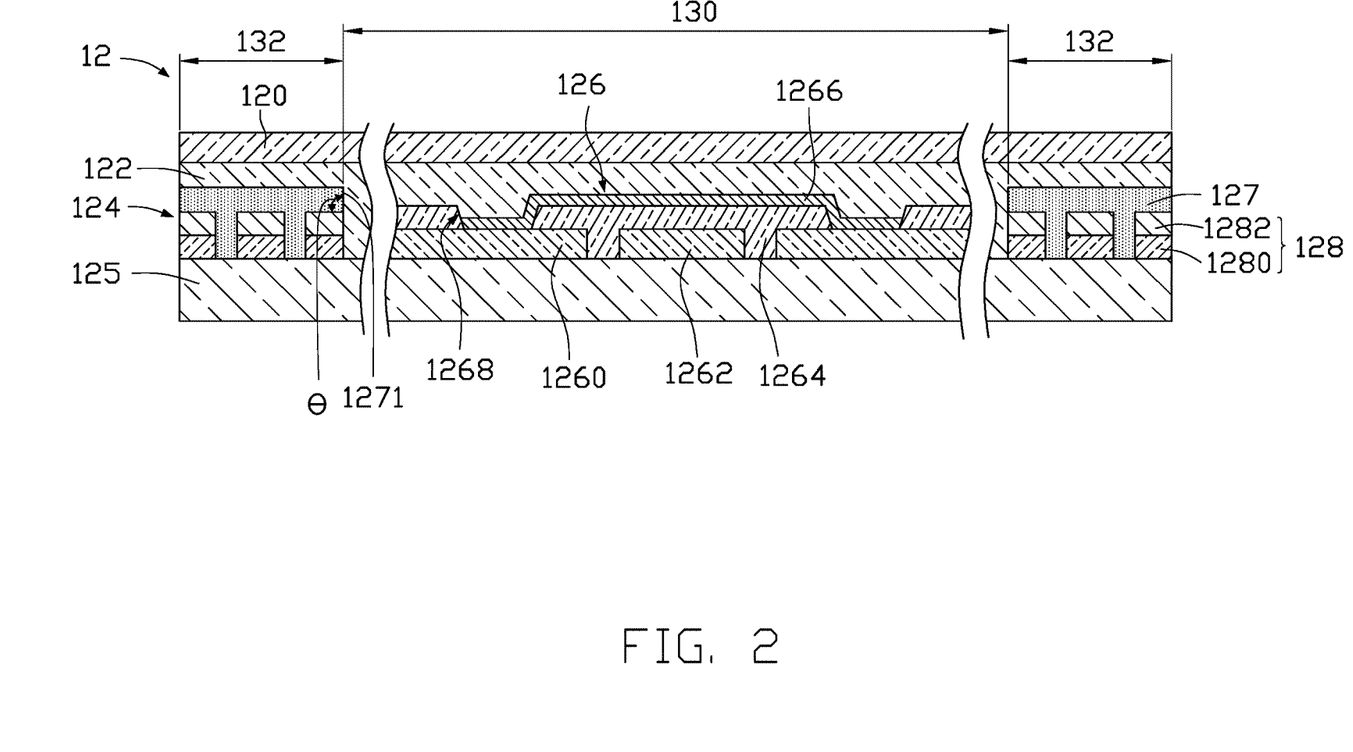
FIG. 2 is a cross-sectional view of a first embodiment of the electronic device of FIG. 1, taken along a line II-II thereof.

FIGS. 1 and 2 illustrate an electronic device 1 according to a first embodiment. The electronic device 1 includes a display panel 10 and a touch panel 12 disposed upon the display panel 10. The display panel 10 is configured to display images. The touch panel 12 is configured to sense touch operations on the electronic device 1. The electronic device 1 includes a display interface 13. The display interface 13 defines a display region 130 and a non-display region 132 surrounding the display region 130. The non-display region 132 may be an opaque region framing the display region 130.

The touch panel 12 includes a cover 120, an adhesive layer 122, and a touch sensing layer 124. The touch sensing layer 124 includes a substrate 125, a touch sensor 126, a decoration layer 127, and a peripheral circuit structure 128. The touch sensor 126 and the peripheral circuit structure 128 are formed on a surface of the substrate 125. The cover 120 is bonded to the surface of the touch sensing layer 124 through the adhesive layer 122. A thickness of the adhesive layer 122 ranges from 20 μm to 150 μm. The cover 120 is configured to protect the touch sensor 126 and the peripheral circuit structure 128 and provides a touch operation interface for the display panel 10. The touch sensor 126 is located in the display region 130. The peripheral circuit structure 128 surrounds the touch sensor 126 and is disposed on the substrate 125, and is electrically connected to the touch sensor 126 for receiving and transmitting touch sensing signals. The decoration layer 127 between the adhesive layer 122 and the peripheral circuit structure 128 is located in the non-display region 132 and contacts with the peripheral circuit structure 128. In the embodiment, the decoration layer 127 entirely covers a surface of the peripheral circuit structure 128 facing away the substrate 125.

The decoration layer 127 may be a photoresist layer, which is part of photoresist layer applied in a process for fabricating the touch sensor 126 and the peripheral circuit structure 128. In the embodiment, the decoration layer 127 may be an opaque layer which shields visible light emitted from the non-display region 132. In other embodiments, the decoration layer 127 may be a transparent photoresist layer for transmitting visible light emitted from the display panel 10. The decoration layer 127 may be a positive or a negative photoresist. A thickness of the decoration layer 127 is in a range from 1 micron (μm) to 20 μm. A surface of the decoration layer 127 facing away the peripheral circuit structure 128 contacts with the adhesive layer 122. A side surface 1271 of the decoration layer 127 may be angled with the substrate 125. The side surface 1271 is a surface connected to a bottom surface of the decoration layer 127 facing the substrate 125 and a top surface of the decoration layer 127 facing away from the substrate 125, and is between the bottom and top surfaces. The side surface 1271 contacts with the adhesive layer 122. An angle θ between the side surface 1271 of the decoration layer 127 and the substrate 125 is ranges from 10 degrees to 95 degrees. In this embodiment, the angle θ is 90 degrees.

The touch sensor 126 includes a plurality of first sensing electrodes 1260, a plurality of second sensing electrodes 1262, an insulating layer 1264, and a plurality of bridge portions 1266. The first sensing electrodes 1260 and the second sensing electrodes 1262 are formed from a single electro-conductive layer. The first sensing electrodes 1260 are arranged on the substrate 125 and extend along a first direction. The first sensing electrodes 1260 and the second sensing electrodes 1262 cooperate with each other to form a self-capacitive structure. Each of the first sensing electrodes 1260 senses a location of the touch operation along the first direction. The second sensing electrodes 1262 are arranged on the substrate 125 and extend along a second direction substantially perpendicular to the first direction. Each of the second sensing electrodes 1262 senses a location of the touch operation along the second direction.

The insulating layer 1264 is located upon the first sensing electrodes 1260 and the second sensing electrodes 1262. The insulating layer 1264 insulates the first sensing electrodes 1260 from the second sensing electrodes 1262. The insulating layer 1264 is made of a transparent material. The insulating layer 1264 defines a plurality of holes 1268. Each of the holes 1268 is located upon the first sensing electrodes 1260 or upon the second sensing electrodes 1262 and partially exposes the first sensing electrodes 1260 and the second sensing electrodes 1262 from the insulating layer 1264. In the embodiment, the insulating layer 1264 is located in the display region 130, edges of the insulating layer 1264 can extend into the non-display region 132, to be between the decoration layer 127 and the peripheral circuit structure 128.

Each of the bridge portions 1266 establishes an electrical connection between two adjacent first sensing electrodes 1260. The bridge portion 1266 extends through the hole 1268 and forms an electrical connection between two adjacent second sensing electrodes 1262. The bridge portions 1266 are each made of a conductive material.

A surface of the insulating layer 1264 exposed from the bridge portion 1266 in contact with the adhesive layer 122, and a surface of the bridge portion 1266 facing away the substrate 125 in contact with the adhesive layer 122.

Based on the structure of the touch panel 12, a part of the photoresist layer applied in fabricating process of the peripheral circuit structure 128 serves as the decoration layer 127, thus the decoration layer 127 may be considered as an internal portion of the touch sensing layer 124. The decoration layer 127 is disposed on the peripheral circuit structure 128 instead of being formed on the cover 120. Thus, a decoration layer on the cover 120 may be omitted. Thereby, a thickness of the touch panel 12 may be reduced.

Figure 3:
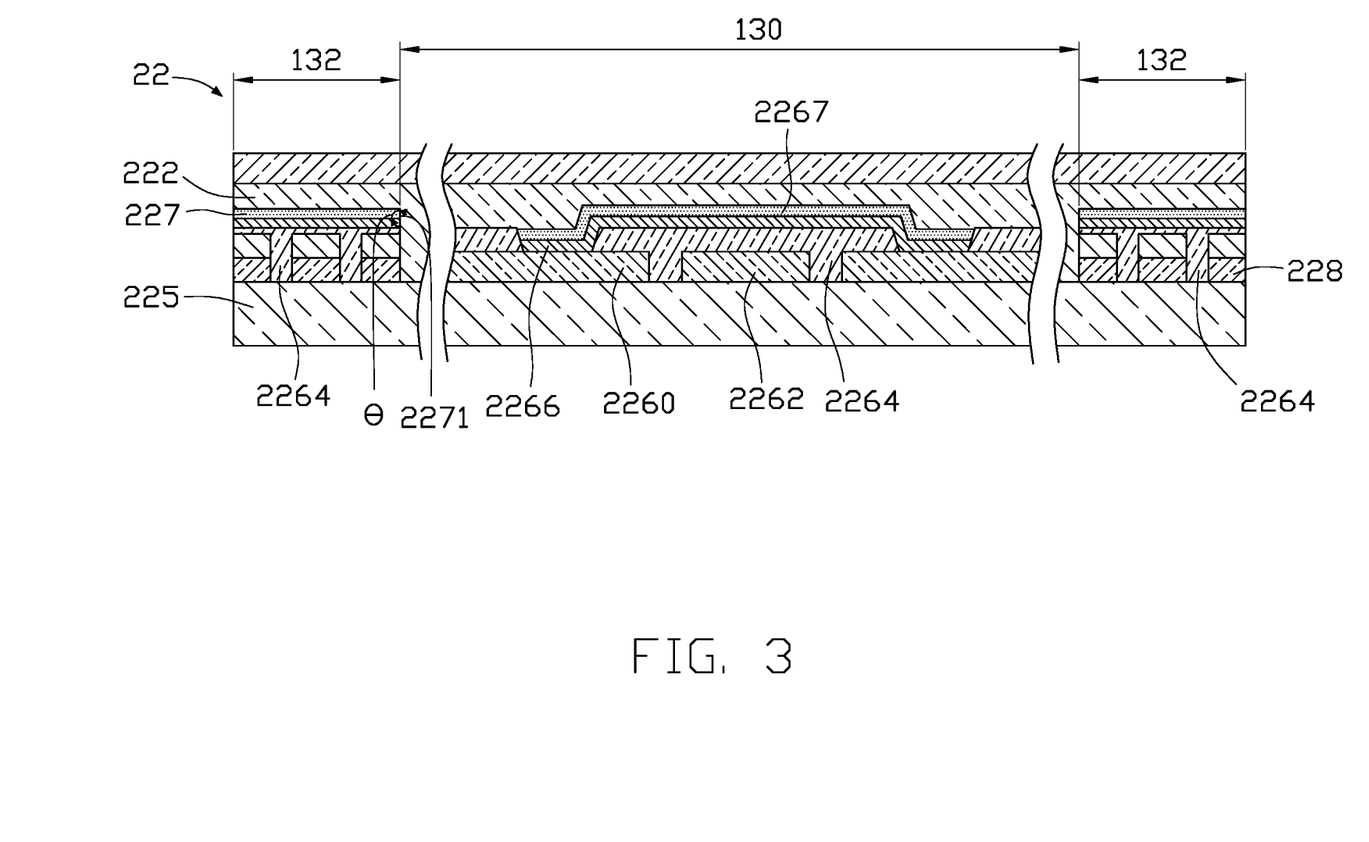
FIG. 3 is a cross-sectional view of a second embodiment of the electronic device.

FIG. 3 illustrates the touch panel 22 according to a second embodiment. The touch panel 22 is similar to the touch panel 12. Elements in FIG. 3 with the same labels are the same as those in FIG. 2. The difference between the touch panel 22 and the touch panel 12 is the insulating layer 2264 and the decoration layer 227. A part of the insulating layer 2264 extends to being in the non-display region 132, and covers a surface of the peripheral circuit structure 228 away from the substrate 225. The decoration layer 227 contacts with a portion of the insulating layer 2264 located in the non-display region 132. The touch panel 22 further includes a black layer 2267. The black layer 2267 is disposed on the bridge portion 2266 and contacts with the bridge portion 2266. The black layer 2267 may be a photoresist layer and prevents the bridge portion 2266 from reflecting light.

Based on the structure of the touch panel 22, a part of the photoresist layer applied in fabricating process of the bridge portion 2266 serves as the decoration layer 227, thus the decoration layer 227 is considered as an internal portion of the touch panel 22. The decoration layer 227 is coplanar with the black layer 2267. Thus, a decoration layer on the cover 120 may be omitted. Thereby, a thickness of the touch panel 22 may be reduced.

Figure 4:
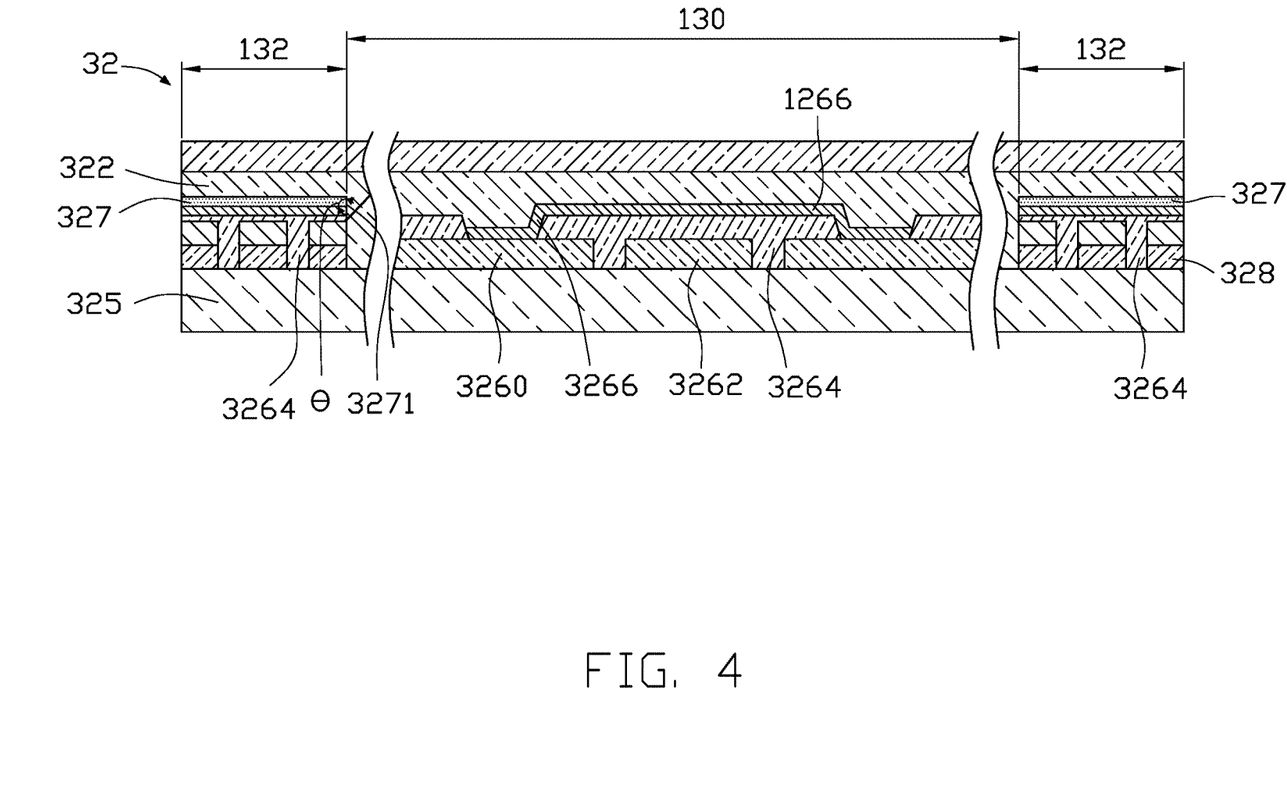
FIG. 4 is a cross-sectional view of a third embodiment of the electronic device.

FIG. 4 illustrates the touch panel 32 according to a third embodiment. The touch panel 32 is similar to the touch panel 12. Elements in FIG. 4 with the same labels are the same as those in FIG. 2. The difference between the touch panel 32 and the touch panel 12 is the insulating layer 3264 and the decoration layer 327. A part of the insulating layer 3264 extends to being in the non-display region 132, and covers a surface of the peripheral circuit structure 328 away from the substrate 325. The decoration layer 327 contacts with a portion of the insulating layer 3264 located in the non-display region 132. A surface of the bridge portion 3266 facing way from the substrate 325 contacts with the adhesive layer 322. The difference between the touch panel 32 and the touch panel 22 is the absence of the black layer 2267.

Based on the structure of the touch panel 32, a part of a photoresist layer applied in fabricating process of the bridge portion 3266 serves as the decoration layer 327, thus the decoration layer 327 is considered as an internal portion of the touch sensing layer 324. The decoration layer 327 is disposed on the insulating layer 3264 instead of being formed on the cover 120. Thus, a decoration layer on the cover may be omitted. Therefore, a thickness of the touch panel 32 may be reduced.

Figure 5:
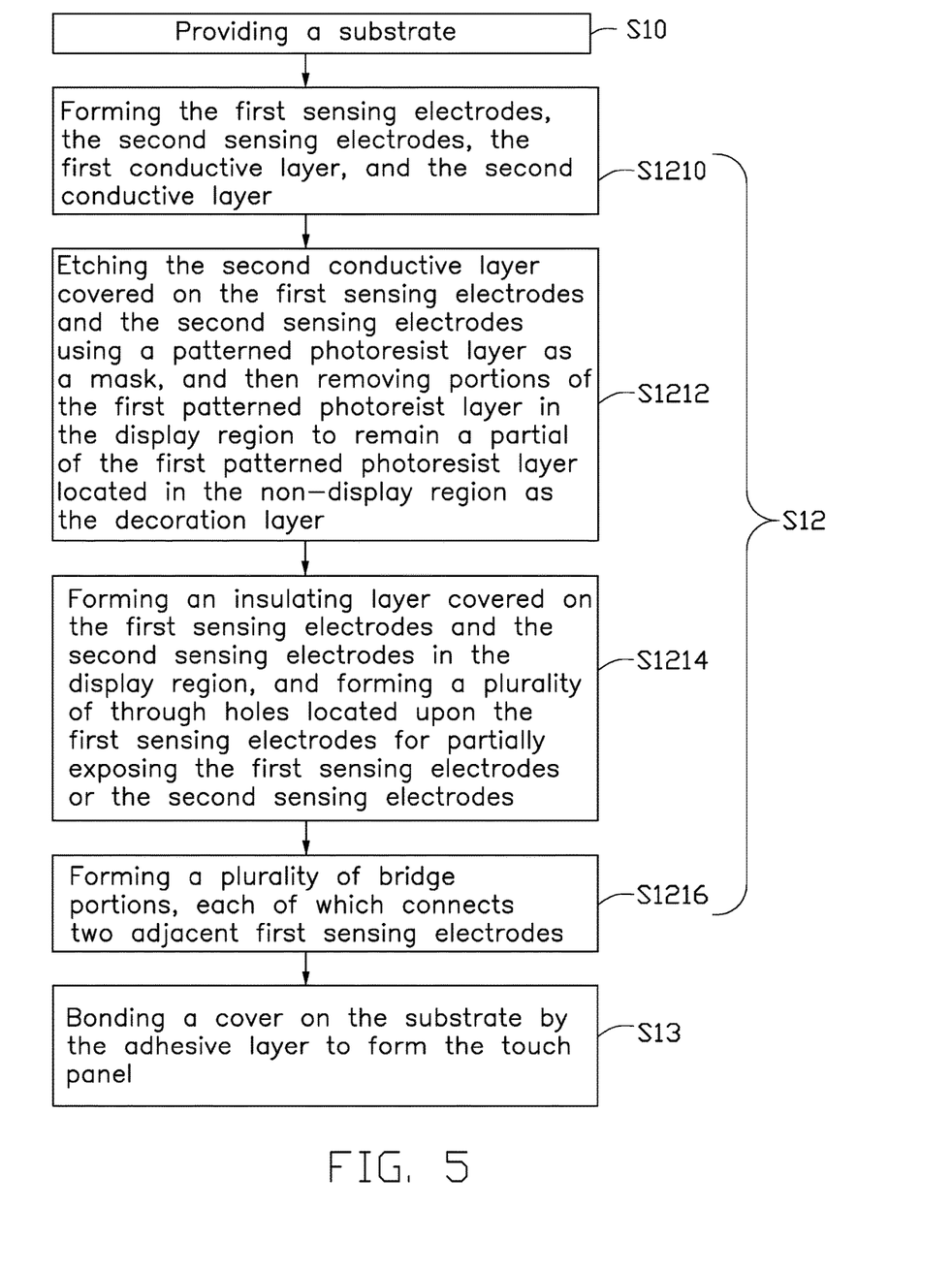
FIG. 5 is a flowchart of a first embodiment of a method for fabricating an electronic device.

FIG. 5 illustrates a method for fabricating the electronic device according to a first embodiment. The method is provided by way of example, as there are a variety of ways to carry out the method. The method described below may be carried out using the configurations illustrated in FIGS. 1-2, for example, and various elements of these figures are referenced in explaining the method. Each block shown in FIG. 5 represents one or more processes, methods or subroutines, carried out in the method. Furthermore, the order of blocks is illustrative only and the order of the blocks can change. Additional blocks can be added or blocks can be removed, without departing from this disclosure. The method can begin at block S10.

Figure 8:
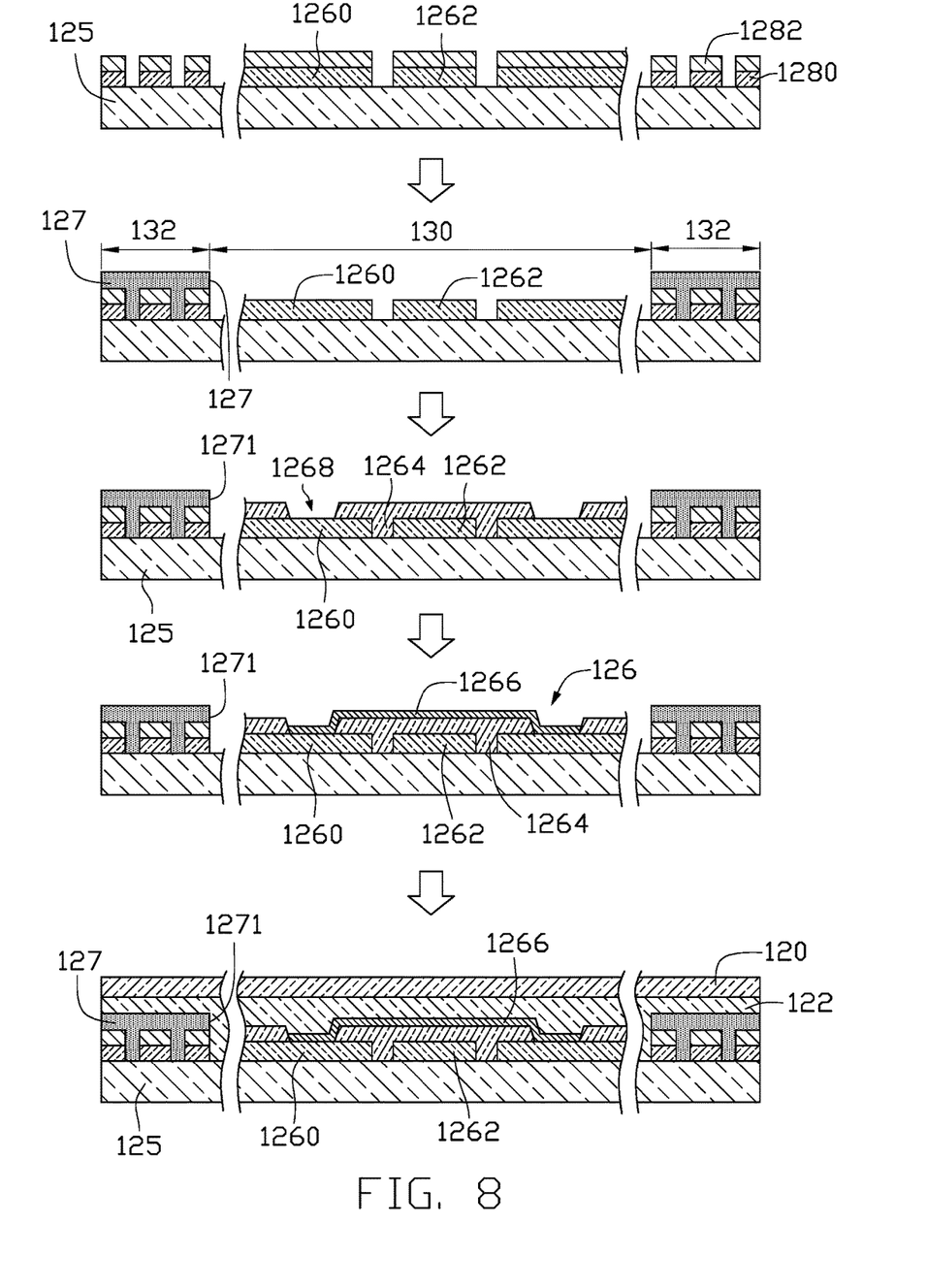
FIG. 8 is cross-sectional views of structures development in steps S1210 through S1216 of the method of FIG. 5.

At block S10, referring also to FIG. 8, providing the substrate 125. The substrate 125 is made of a transparent material. In the embodiment, the substrate 125 is made of transparent glass.

At block S12, forming the touch sensor 126 and the peripheral circuit structure 128 by etching at least one conductive layer using a patterned photoresist layer as a mask. A part of the patterned photoresist layer remains in the non-display region 132 as the decoration layer 127.

The touch sensor 126 formed on the substrate 125 is located in the display region 130. The peripheral circuit structure 128 surrounds the touch sensor 126 and is electrically connected to the touch sensor 126 for receiving and transmitting touch signals. The peripheral circuit structure 128 is located in the non-display region 132. The touch sensor 126 and the peripheral circuit structure 128 are formed on a surface of the substrate 125. In other embodiments, a partial of the peripheral circuit structure 128 extends to being in the display region 130.

The peripheral circuit structure 128 includes a first conductive layer 1280 and a second conductive layer 1282 disposed on the first conductive layer 1280. The first conductive layer 1280 is made of a transparent material, such as Indium Tin Oxide (ITO). The second conductive layer 1282 is made of a metal material. The touch sensor 126 includes a plurality of first sensing electrodes 1260, a plurality of second sensing electrodes 1262, an insulating layer 1264 covering the first sensing electrodes 1260 and the second sensing electrodes 1262, and a plurality of bridge portions 1266. The first sensing electrodes 1260 and the second sensing electrodes 1262 are made of transparent materials.

The process of the block S12 further includes a plurality of sub-processes of blocks, S1210-S1216.

At block S1210, referring also to FIG. 8, forming the first sensing electrodes 1260, the second sensing electrodes 1262, the first conductive layer 1280, and the second conductive layer 1282 on the substrate 125. The first sensing electrodes 1260, the second sensing electrodes 1262, and the first conductive layer 1280 are in contact with the substrate 125. In the process of fabricating the second conductive layer 1282, the second conductive layer 1282 further may be arranged to cover the first sensing electrodes 1260 and the second sensing electrodes 1262.

At block S1212, referring also to FIG. 8, etching and removing the second conductive layer 1282 covering the first sensing electrodes 1260 and the second sensing electrodes 1262 in the display region 130 using a first patterned photoresist layer as a mask. Portions of the first patterned photoresist layer in the display region 130 are removed to leave part of the first photoresist layer in the non-display region 132 as the decoration layer 127.

At block S1214, referring also to FIG. 8, forming an insulating layer 1264 covering the first sensing electrodes 1260 and the second sensing electrodes 1262 in the display region 130. A plurality of holes 1268 located upon the first sensing electrodes 1260 are formed, and partially expose the first sensing electrodes 1260.

At block S1216, referring also to FIG. 8, forming a plurality of bridge portions 1266, each of which establishes an electrical connection between two adjacent first sensing electrodes 1260 extending through the holes 1268.

At block S13, bonding a cover 120 on the substrate 125 by the adhesive layer 122 to form the touch panel 32.

Figure 6:
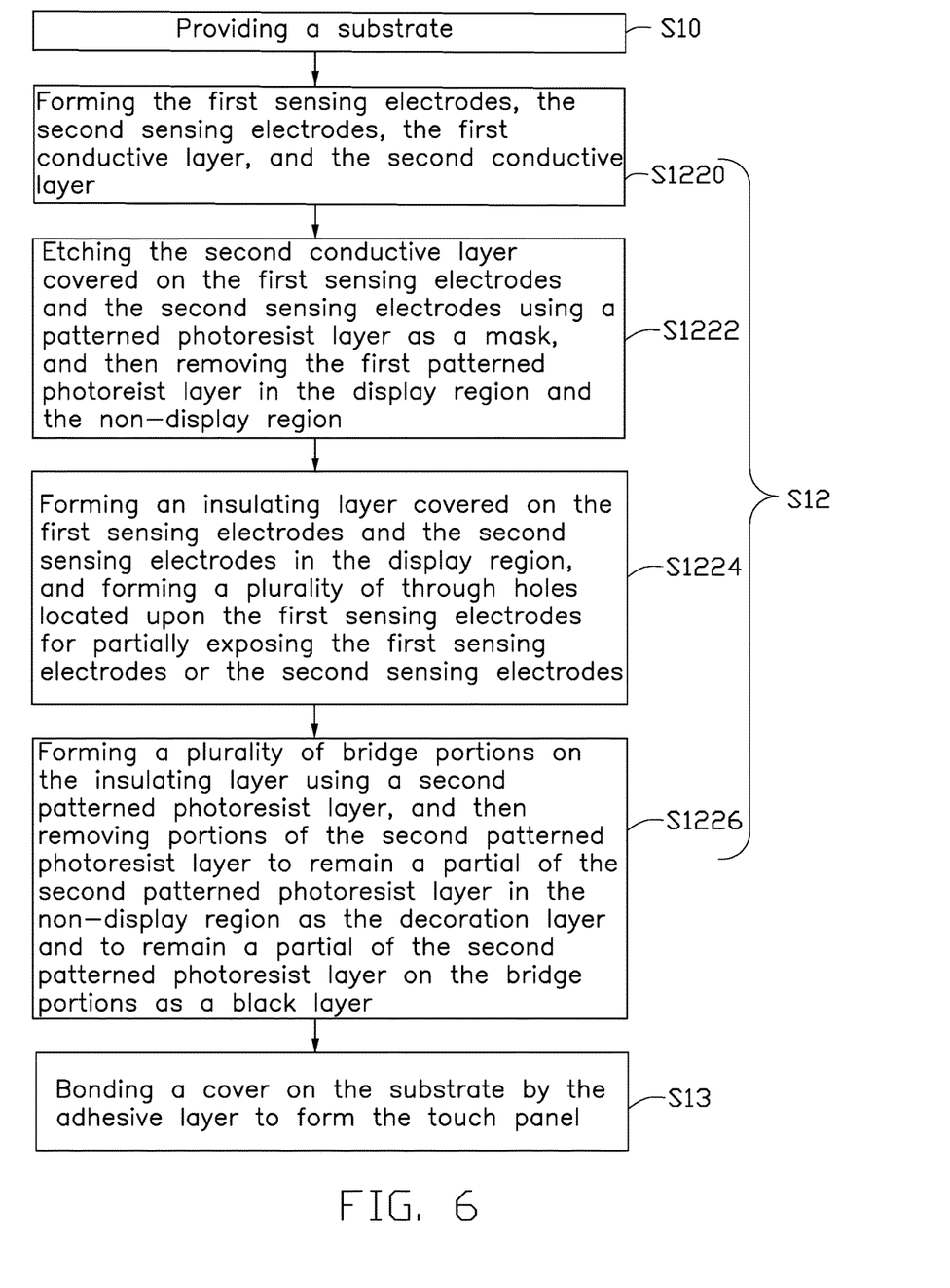
FIG. 6 is a flowchart of a second embodiment of a method for fabricating an electronic device.

FIG. 6 illustrates a method for fabricating the electronic device according to a second embodiment. The method is provided by way of example, as there are a variety of ways to carry out the method. The method described below can be carried out using the configurations illustrated in FIG. 3, for example, and various elements of these figures are referenced in explaining the method. Each block shown in FIG. 6 represents one or more processes, methods, or subroutines, carried out in the method. Furthermore, the order of blocks is illustrative only and the order of the blocks can change. Additional blocks can be added or blocks can be removed, without departing from this disclosure. The method can begin at block S10.

Figure 9:
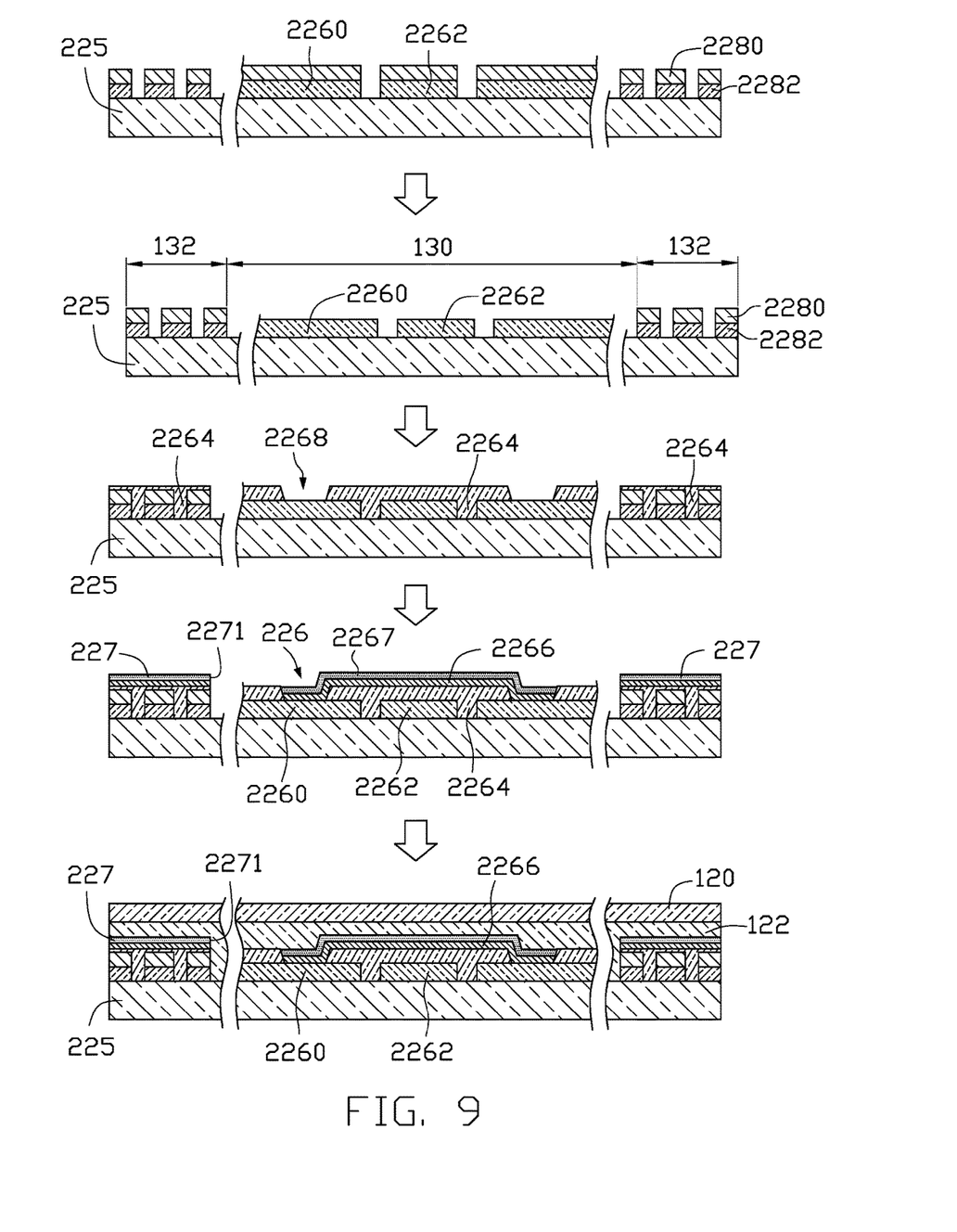
FIG. 9 is cross-sectional views of structures development in steps S1220 through S1226 of the method of FIG. 6.

At block S10, referring also to FIG. 9, providing a substrate 225. The substrate 225 is made of a transparent material. In the embodiment, the substrate 225 may be a transparent glass.

At block S12, forming the touch sensor 226 and the peripheral circuit structure 228 by etching at least one conductive layer using a patterned photoresist layer as a mask. A part of the patterned photoresist layer remains in the non-display region 132 as a decoration layer 227.

The touch sensor 226 formed on the substrate 225 is located in the display region 130. The peripheral circuit structure 228 surrounds the touch sensor 226 and is electrically connected to the touch sensor 226 for receiving and transmitting touch signals. The peripheral circuit structure 228 is located in the non-display region 132. In the embodiment, a part of the peripheral circuit structure 228 extends to being in the display region 130.

The peripheral circuit structure 228 includes a first conductive layer 2280 and a second conductive layer 2282 disposed on the first conductive layer 2280. The first conductive layer 2280 is made of a transparent material, such as Indium Tin Oxide (ITO). The second conductive layer 2282 is made of a metal material. The touch sensor 226 includes a plurality of first sensing electrodes 2260, a plurality of second sensing electrodes 2262, an insulating layer 2264 covered the first sensing electrodes 2260 and the second sensing electrodes 2262, and a plurality of bridge portions 2266. The first sensing electrodes 2260 and the second sensing electrodes 2262 are made of transparent materials.

The process of the block S12 further includes a plurality of sub-processes of blocks S1220-S1226.

At block S1220, referring also to FIG. 9, forming the first sensing electrodes 2260, the second sensing electrode 2262, the first conductive layer 2280, and a second conductive layer 2282. The first sensing electrodes 2260, the second sensing electrodes 2262, and the first conductive layer 2280 are in contact with the substrate 225. In the process of fabricating the second conductive layer 2282, the second conductive layer 2282 may be arranged to cover the first sensing electrodes 2260 and the second sensing electrodes 2262.

At block S1222, referring also to FIG. 9, etching and removing the second conductive layer 2282 covering the first sensing electrodes 2260 and the second sensing electrodes 2262 in the display region 130 using a first patterned photoresist layer as a mask. The first patterned photoresist layer in the display region 130 and the non-display region 132 is then removed.

At block S1224, referring also to FIG. 9, forming an insulating layer 2264 covering the first sensing electrodes 2260 and the second sensing electrodes 2262 in the display region 130. A plurality of holes 2268 located upon the first sensing electrodes 2260 are formed, and partially expose the first sensing electrodes 2260.

At block S1226, referring also to FIG. 9, forming a plurality of bridge portions 2266 on the insulating layer 2264 using a second patterned photoresist layer as a mask. Portions of the second patterned photoresist layer are then removed to leave part of the second patterned photoresist layer in the non-display region 132 as the decoration layer 227 and also, as a black layer 2267 on the bridge portions 2266. Each of the bridge portions 2266 establishes an electrical connection between two adjacent first sensing electrodes 2260 extending through the holes 2268.

At block S13, bonding a cover 120 on the substrate 225 by the adhesive layer 122 to form the touch panel 22.

Figure 7:
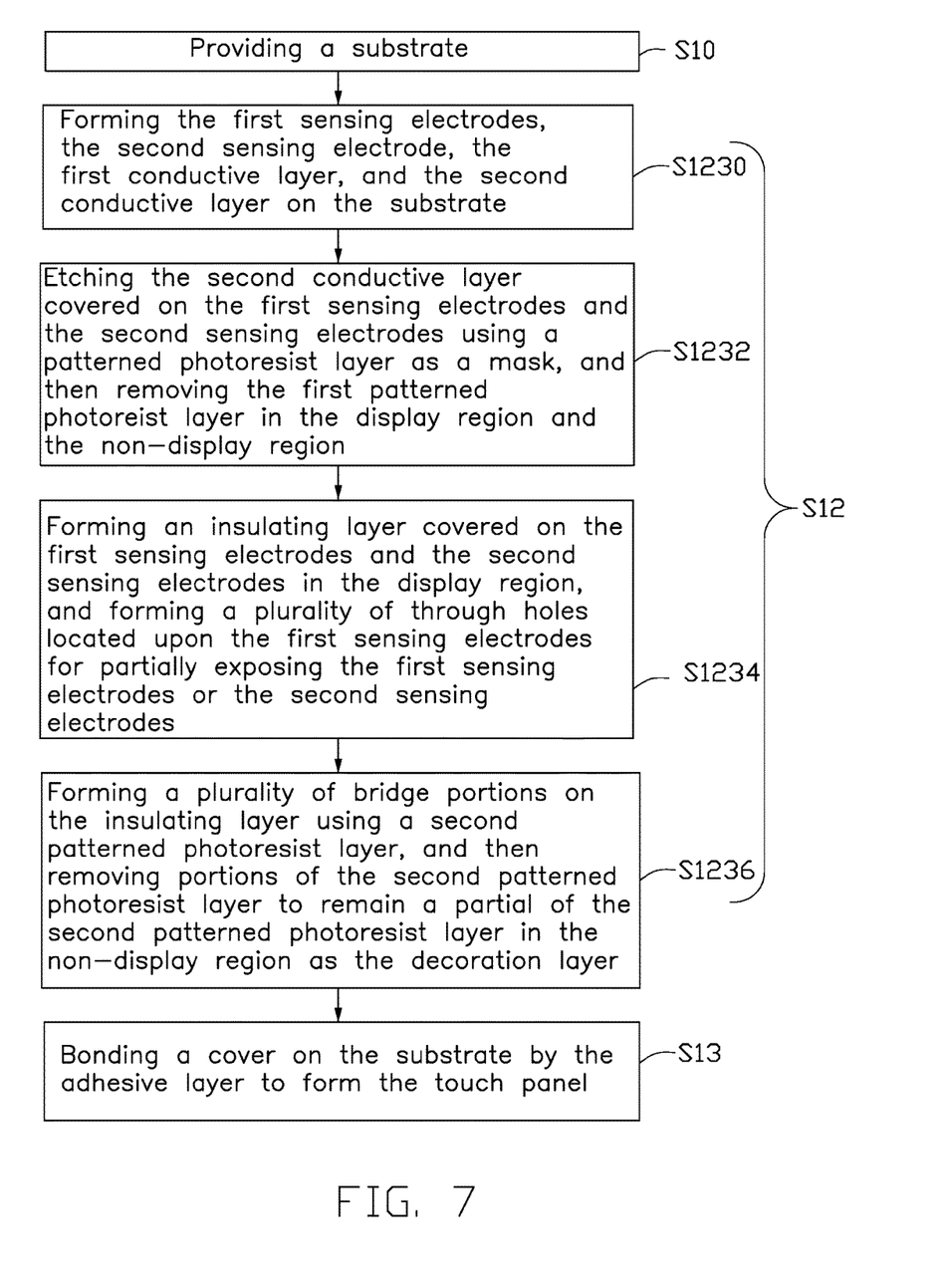
FIG. 7 is a flowchart of a third embodiment of a method for fabricating an electronic device.

FIG. 7 illustrates a method for fabricating the electronic device according to a third embodiment. The method is provided by way of example, as there are a variety of ways to carry out the method. The method described below may be carried out using the configurations illustrated in FIG. 4, for example, and various elements of these figures are referenced in explaining the method. Each block shown in FIG. 7 represents one or more processes, methods, or subroutines, carried out in the method. Furthermore, the order of blocks is illustrative only and the order of the blocks can change. Additional blocks can be added or blocks can be removed, without departing from this disclosure. The method can begin at block S10.

Figure 10:
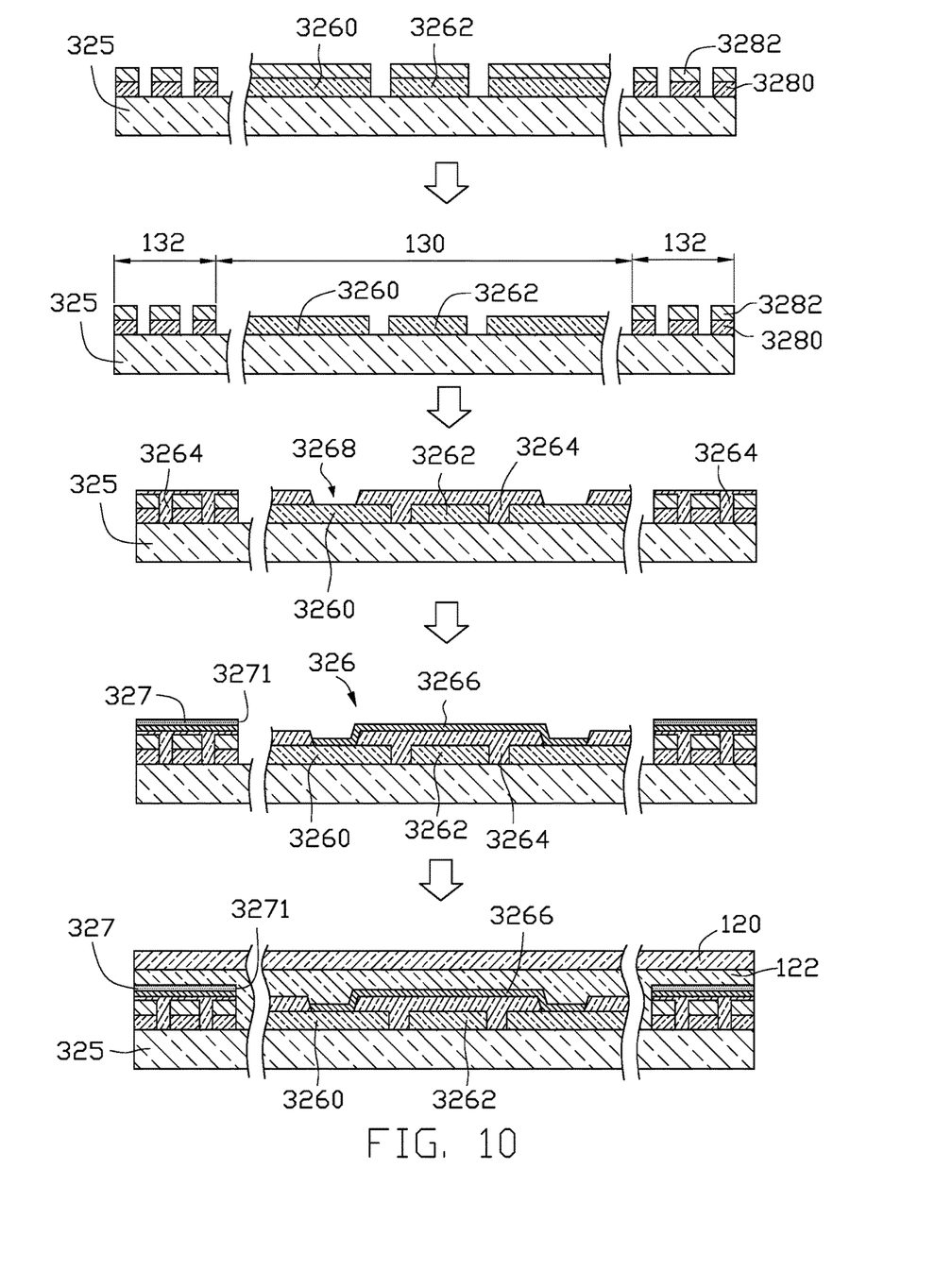
FIG. 10 is cross-sectional views of structures development in steps S1230 through S1236 of the method of FIG. 7.

At block S10, referring also to FIG. 10, providing a substrate 325. The substrate 325 is made of a transparent material. In the embodiment, the substrate 325 may be a transparent glass.

At block S12, forming the touch sensor 326 and the peripheral circuit structure 328 by etching at least one conductive layer using a patterned photoresist layer as a mask. A part of the patterned photoresist layer in the non-display region 132 remains as a decoration layer 327.

The touch sensor 326 formed on the substrate 325 is located in the display region 130. The peripheral circuit structure 328 surrounds the touch sensor 326 and is electrically connected to the touch sensor 326 for receiving and transmitting touch signals. The peripheral circuit structure 328 is located in the non-display region 132. In the embodiment, a part of the peripheral circuit structure 328 extends to being in the display region 130.

The peripheral circuit structure 328 includes a first conductive layer 3280 and a second conductive layer 3282 disposed on the first conductive layer 3280. The first conductive layer 3280 is made of a transparent material, such as Indium Tin Oxide (ITO). The second conductive layer 3282 is made of a metal material. The touch sensor 326 includes a plurality of first sensing electrodes 3260, a plurality of second sensing electrodes 3262, an insulating layer 3264 covered the first sensing electrodes 3260 and the second sensing electrodes 3262, and a plurality of bridge portions 3266. The first sensing electrodes 3260 and the second sensing electrodes 3262 are made of transparent materials.

The process of the block S12 further includes a plurality of sub-processes of blocks S1230-S1236.

At block S1230, referring also to FIG. 10, forming the first sensing electrodes 3260, the second sensing electrode 3262, the first conductive layer 3280, and the second conductive layer 3282 on the substrate 325. The first sensing electrodes 3260, the second sensing electrodes 3262, and the first conductive layer 3280 are in contact with the substrate 325. In the process of fabricating the second conductive layer 3282, the second conductive layer 3282 may be arranged to cover the first sensing electrodes 3260 and the second sensing electrodes 3262.

At block S1232, referring also to FIG. 10, etching and removing the second conductive layer 3282 covering the first sensing electrodes 3260 and the second sensing electrodes 3262 in the display region 130 using a first patterned photoresist layer as a mask, and then removing the first patterned photoresist layer in the display region 130 and the non-display region 132.

At block S1234, referring also to FIG. 10, forming an insulating layer 3264 covering the first sensing electrodes 3260 and the second sensing electrodes 3262 in the display region 130. A plurality of holes 3268 upon the first sensing electrodes 3260 are formed, and partially expose the first sensing electrodes 3260.

At block S1236, referring also to FIG. 10, forming a plurality of bridge portions 3266 on the insulating layer 3264 using a second patterned photoresist layer as a mask. Portions of the second patterned photoresist layer are removed to leave part of the second patterned photoresist layer in the non-display region 132 as the decoration layer 327. Each of the bridge portions 3266 establishes an electrical connection between two adjacent first sensing electrodes 3260 extending through the holes 3268.

At block S13, bonding a cover 120 on the substrate 325 by the adhesive layer 122 to form the touch panel 32.

The method of fabricating the touch panel 32 leaves a part of the photoresist layer on the touch sensor 326 and the peripheral circuit structure 328 serves as the decoration layer, thus the decoration layer 327 is considered as an internal portion of the touch sensing layer 326. A decoration layer on the cover can thus be omitted. Therefore, a thickness of the touch panel 32 may be reduced.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims.

What is claimed is:

1. A touch panel for an electronic device for sensing touch operations, the touch panel defining a display region and a non-display region, the non-display portions surrounding at least parts of the display region; the touch panel comprising:
   a cover; and
   a touch sensing layer bonded with the cover by an adhesive layer, the touch sensing layer comprising:
   a substrate, portions of the substrate in the display region and portions of the substrate in the non-display region;
   a touch sensor having portions disposed on the portions of the substrate in the display region;
   a peripheral circuit structure having portions disposed on portions of the substrate in the non-display region, and configured to electrically connect with the touch sensor for receiving signals from the touch sensor; and
   a decoration layer disposed upon the touch sensor and the peripheral circuit structure and covered by the adhesive layer;
   wherein a patterned photoresist layer is provided on a single electro-conductive layer to form electrodes of the touch sensor, a part of the patterned photoresist layer being removed and the remaining part of the patterned photoresist layer being retained as the decoration layer.

2. The touch panel of claim 1, wherein the decoration layer is a color photoresist layer and shields visible light emitted from the non-display region.

3. The touch panel of claim 1, wherein the decoration layer is a transparent photoresist layer.

4. The touch panel of claim 1, wherein a side surface of the decoration layer is angled with the substrate; an angle defined by a side surface of the decoration layer ranges from 10 degrees to 95 degrees.

5. The touch panel of claim 1, wherein the decoration layer contacts the peripheral circuit structure.

6. The touch panel of claim 1, wherein the touch sensor comprises a plurality of first sensing electrodes, a plurality of second sensing electrodes, an insulating layer, and a plurality of bridge portions; the insulating layer covers the plurality of first sensing electrodes and the plurality of second sensing electrodes; each bridge portion is disposed on the insulating layer, and establishes an electrical connection between two adjacent first sensing electrodes or two adjacent second sensing electrodes by portions of the bridge portions extending through holes in the insulating layer; the insulating layer further covers the portions of the peripheral circuit structure in the non-display region, and the decoration layer contacts with portions of the insulating layer in the non-display region.

7. The touch panel of claim 6, wherein the touch sensor further comprises a black layer disposed on the plurality of bridge portions; the black layer prevents the plurality of bridge portions from reflecting light.

8. An electronic device comprising:
a display panel; and
a touch panel disposed on the display panel, and defining a display region for displaying images and a non-display region surrounding at least parts of the display region, the touch panel comprising:
a cover; and
a touch sensing layer bonded with the cover by an adhesive layer,
wherein the touch sensing layer comprises a substrate, a touch sensor having portions disposed on portions of the substrate in the display region, a peripheral circuit structure having portions disposed on portions of the substrate in the non-display region, and a decoration layer; the peripheral circuit structure electrically connects with the touch sensor for receiving signals from the touch sensor; the decoration layer is disposed upon the touch sensor and the peripheral circuit structure, and is covered by the adhesive layer;
wherein a patterned photoresist layer is provided on a single electro-conductive layer to form electrodes of the touch sensor, a part of the patterned photoresist layer being removed and the remaining part of the patterned photoresist layer being retained as the decoration layer.

9. The electronic device of claim 8, wherein a side surface of the decoration layer is angled with the substrate; an angle defined by the side surface of the decoration layer ranges from 10 degrees to 95 degrees.

10. The electronic device of claim 8, wherein the decoration layer contacts with the peripheral circuit structure.

11. The electronic device of claim 8, wherein the touch sensor comprises a plurality of first sensing electrodes, a plurality of second sensing electrodes, an insulating layer, and a plurality of bridge portions; the insulating layer covers the plurality of first sensing electrodes and the plurality of second sensing electrodes; each bridge portion is disposed on the insulating layer, and establishes an electrical connection between two adjacent first sensing electrodes or two adjacent second sensing electrodes; the insulating layer further covers the peripheral circuit structure in the non-display region, and the decoration layer contacts with the insulating layer in the non-display region.

12. The shift register module of claim 11, wherein the touch sensor further comprises a black layer disposed on the plurality of bridge portions; the black layer prevents the plurality of bridge portions from reflecting light.

13. A method for fabricating a touch panel, the touch panel defining a display region for displaying images and a non-display region, the non-display region portions connecting and surrounding at least parts of the display region; the method comprising:
providing a substrate;
forming a touch sensor and a peripheral circuit structure on the substrate by etching at least one conductive layer using a patterned photoresist layer as a mask, and retaining a part of the patterned photoresist layer in the non-display region as a decoration layer; and
bonding a cover on the substrate by an adhesive layer to form the touch panel.

14. The method of claim 13, wherein the decoration layer contacts with the peripheral circuit structure.

15. The method of claim 14, wherein the step of forming a touch sensor and a peripheral circuit structure on the substrate by etching at least one conductive layer using a patterned photoresist layer as a mask, and remaining a partial of the patterned photoresist layer in the non-display region as a decoration layer further comprising:
forming a plurality of first sensing electrodes, a plurality of second sensing electrode, a first conductive layer, and a second conductive layer on the substrate;
etching the second conductive layer covered on the first sensing electrodes and the second sensing electrodes using the patterned photoresist layer as a mask, and then removing portions of the patterned photoresist layer in the display region to remain a partial of the patterned photoreist layer in the non-display region as the decoration layer
forming an insulating layer covering the first sensing electrodes and the second sensing electrodes in the display region, and forming a plurality of holes disposed upon the first sensing electrodes, which partially expose the first sensing electrodes; and
forming a plurality of bridge portions, each of which connects two adjacent first sensing electrodes.

16. The method of claim 15, wherein the decoration layer contacts with the insulating layer.

17. The method of claim 16, wherein the step of forming a touch sensor and a peripheral circuit structure on the substrate by etching at least one conductive layer using a patterned photoresist layer as a mask, and remaining a part of the patterned photoresist layer in the non-display region as a decoration layer further comprising:
forming a plurality of first sensing electrodes, a plurality of second sensing electrode, a first conductive layer, and a second conductive layer on the substrate;
etching the second conductive layer covered on the first sensing electrodes and the second sensing electrodes;
forming an insulating layer covering the first sensing electrodes and the second sensing electrodes in the display region, and forming a plurality of holes disposed upon the first sensing electrodes and the second electrodes, which partially expose the first sensing electrodes; and
forming a plurality of bridge portions on the insulating layer using the patterned photoresist layer as a mask, and then removing portions of the patterned photoresist layer to remain a partial of the patterned photoresist layer in the non-display region as the decoration layer and also to remain a partial of the patterned photoresist layer on the bridge portions as a black layer; each of bridge portions connects two adjacent first sensing electrodes.

18. The method of claim 16, wherein the step of forming a touch sensor and a peripheral circuit structure on the substrate by etching at least one conductive layer using a patterned photoresist layer as a mask, and remaining a part of the patterned photoresist layer in the non-display region as a decoration layer further comprising:
forming a plurality of first sensing electrodes, a plurality of second sensing electrode, a first conductive layer, and a second conductive layer on the substrate;
etching the second conductive layer covered on the first sensing electrodes and the second sensing electrodes;

forming an insulating layer covering the first sensing electrodes and the second sensing electrodes in the display region, and forming a plurality of holes disposed upon the first sensing electrodes, which partially expose the first sensing electrodes; and forming a plurality of bridge portions on the insulating layer using a second patterned photoresist layer as a mask, and then removing the second patterned photoresist layer to leave a part of the second patterned photoresist layer in the non-display region as the decoration layer; each of bridge portions connects two adjacent first sensing electrodes.

* * * * *